UNITED STATES PATENT OFFICE.

SAMUEL KLEIN AND ALEXANDER SCHATTELS, OF LUGOS, AUSTRIA-HUNGARY.

COMPOSITION FOR FILLING UP CRACKS IN BARRELS AND OTHER VESSELS.

SPECIFICATION forming part of Letters Patent No. 378,596, dated February 28, 1888.

Application filed May 21, 1887. Serial No. 238,980. (No specimens.)

*To all whom it may concern:*

Be it known that we, SAMUEL KLEIN and ALEXANDER SCHATTELS, subjects of the Emperor of Austria-Hungary, and residing at Lugos, in the Kingdom of Hungary and Empire of Austria-Hungary, have invented a new and useful Composition of Matter for the Purpose of Stopping Leaks in Barrels and other Wooden Vessels, of which the following is a specification.

Our compound consists of fifteen parts, by weight, of vaseline; five parts, by weight, of paraffine; thirty-five parts, by weight, of porcelain clay or kaolin, and one part, by weight, of gutta-percha.

We prepare our compound as follows: First the vaseline, paraffine, and gutta-percha, in the said proportions, are heated together in a suitable vessel until they are all melted and liquefied. Into this liquid at boiling heat we stir the above-named proportion of porcelain clay. Having stirred this mixture until its components are thoroughly mixed, we allow it to cool, when the compound is ready for use.

To use this compound it is applied to the barrel or other vessel so as to fill up the crack through which the vessel leaks until a sufficient body of the compound is laid on to stop the leak. It will then be found that this compound, being insoluble in water, will effectually stop the leaks and keep them stopped at all ordinary temperatures.

What we claim, and desire to secure by Letters Patent, is—

The compound of vaseline, paraffine, porcelain clay, and gutta-percha hereinbefore described, substantially as and for the purpose set forth.

In witness whereof we have hereunto signed our names in the presence of two subscribing witnesses.

SAMUEL KLEIN.
ALEXANDER SCHATTELS.

Witnesses:
HENRY STERNE,
M. ROSENBERG.